United States Patent
Prouvost et al.

(10) Patent No.: US 8,879,538 B2
(45) Date of Patent: Nov. 4, 2014

(54) METHOD AND GATEWAY FOR CONNECTING IP COMMUNICATION ENTITIES VIA A RESIDENTIAL GATEWAY

(75) Inventors: Sébastien Prouvost, Issy les Moulineaux (FR); Sébastien Garcin, Issy les Moulineaux (FR); Bruno Chatras, Paris (FR)

(73) Assignee: Orange, Paris (FR)

( * ) Notice: Subject to any disclaimer, the term of this patent is extended or adjusted under 35 U.S.C. 154(b) by 1170 days.

(21) Appl. No.: 12/086,919

(22) PCT Filed: Dec. 21, 2006

(86) PCT No.: PCT/FR2006/002835
§ 371 (c)(1),
(2), (4) Date: Aug. 26, 2008

(87) PCT Pub. No.: WO2007/071847
PCT Pub. Date: Jun. 28, 2007

(65) Prior Publication Data
US 2009/0016324 A1    Jan. 15, 2009

(30) Foreign Application Priority Data
Dec. 23, 2005 (FR) .................................... 05 13291

(51) Int. Cl.
H04L 12/66 (2006.01)
H04L 29/12 (2006.01)
H04L 29/06 (2006.01)

(52) U.S. Cl.
CPC ...... *H04L 29/12367* (2013.01); *H04L 61/2514* (2013.01); *H04L 29/06027* (2013.01); *H04L 65/1069* (2013.01); *H04L 12/66* (2013.01)

USPC .......................................................... 370/352

(58) Field of Classification Search
None
See application file for complete search history.

(56) References Cited

U.S. PATENT DOCUMENTS

| | | | |
|---|---|---|---|
| 2002/0150221 A1* | 10/2002 | Carson et al. | ................. 379/126 |
| 2003/0039238 A1 | 2/2003 | Ollis et al. | |
| 2004/0252683 A1 | 12/2004 | Kennedy et al. | |

FOREIGN PATENT DOCUMENTS

WO    WO 02/45373 A2    6/2002

OTHER PUBLICATIONS

Rosenberg, J. et al.: "SIP: Session Initiation Protocol" IEFT Standard, Internet Engineering Task Force, IEFT, CH, Jun. 2002, pp. 1-269, XP015009030 ISSN: 000-0003 Chap. 2, 4, 5, 8, 10,12,13, 16, 19, 20.

(Continued)

*Primary Examiner* — Minh-Trang Nguyen
(74) *Attorney, Agent, or Firm* — Knobbe Martens Olson & Bear LLP

(57) ABSTRACT

The invention concerns a method for connection to IP communication entities ($E_{x,pu}$, $E_{y,pu}$) via a residential gateway ($P_z$). It consists in registering (A) the public identity (pu) of each connected terminal associated with the network address (z) of the residential gateway, so that any message should be addressed to said residential gateway ($P_z$) and in transferring (B) said message to all the IP communication entities connected to the residential gateway ($P_z$), thus permitting each of the latter to filter (C) the message and to determine whether the message is addressed to a public identity which is assigned thereto. The invention is applicable to IP terminals managed in accordance with SIP or H323 protocol.

8 Claims, 4 Drawing Sheets

(56) References Cited

OTHER PUBLICATIONS

ITU-T Study Group 16: "ITU-T Recommendation H.323: Packet-based multimedia communications systems" ITU-T, [online] Jul. 14, 2003, XP002402029 Geneva (Switerland) ITU-T Extrait de l'internet: URL:<http://mirror.itu.int/dms/pay/itu-t/rec/h/T-REC-H.323-200307-S_PDF-E.pdf> [extrait 1e Oct. 6, 2006] Chap. 6-8, Annex 0.

* cited by examiner

"FORKING" (PRIOR ART)

"INTEGRATED APPLICABLE PROCESSING"
(PRIOR ART)

METHOD AND GATEWAY FOR CONNECTING IP COMMUNICATION ENTITIES VIA A RESIDENTIAL GATEWAY

This application claims priority from PCT/FR2006/002835 filed Dec. 21, 2006, which claims priority from French Application FR 05 13291, filed Dec. 23, 2005, both of which are hereby incorporated by reference in their entirety.

BACKGROUND OF THE INVENTION

The invention relates to a method and a system for linking SIP terminals, or terminals that are able to implement a call setup protocol, for example the SIP protocol (for Session Initiation Protocol), to residential gateways.

From the outset, it will be noted that the expression "residential gateway" is understood to refer to a client gateway, that is to say a gateway situated user side, in contradistinction to an item of network equipment situated in the network under the control of the operator. It may, by way of nonlimiting examples, be a gateway for domestic use within a residence or a gateway for professional use within a company. In a general way, it is a gateway for client use.

Numerous offers of telephone facilities over the IP network are, at the present time, based on domestic installations composed of a residential gateway linking one or more mono or multimedia terminals, such as visiophone analog telephones, personal computers, digital televisions for example.

The aforesaid residential gateways are also referred to as intelligent residential gateways, since they make it possible, in fact, to link various categories of networks.

The present invention is aimed more particularly at the functionalities of residential gateways intended for real time electronic communication services, such as VoIP telephony (voice over IP), video-telephony for example.

The aforesaid residential gateways communicate with the operator's network by virtue of a call control protocol whose objective is the creation of a VoIP type communication context between two IP terminations. The objective of the aforesaid SIP protocol defined by the IETF (Internet Engineering Task Force) is to allow setup, modification and termination of multimedia sessions in an IP network or within the framework of architectures for controlling networks based on IP transport.

The role of residential gateways in exchanges of SIP signaling depends on the type of terminal linked up:

when the terminal linked up is not an IP terminal such as an analog, RNIS, Bluetooth, DECT or other terminal, the gateway plays the role of SIP termination by performing the translation between the SIP signaling exchanged with the network and the signaling exchanged with the terminal. This situation corresponds to the case of the "VEG" VoIP Embedded Gateway function represented in FIG. 1a, this type of terminal being referred to as a non-IP terminal in the present patent application;

when the terminal linked up is of IP type, any SIP terminal, the residential gateway behaves as a simple router and steers the SIP messages to the terminal or terminals concerned. The latter then play the role of termination for the SIP protocol.

Current residential gateways may operate according to two operative modes making it possible to manage multiline connection, such as represented in FIG. 1a.

The SIP protocol comprises a registration phase, termed the REGISTER phase, the object of which is the creation, in the network, of an association between the public identity of a user, on the basis of which the latter can be contacted, telephone number or SIP Universal Resource Identifier URI, and the network address or addresses of the terminals enabling the network to contact them. The aforesaid association is stored in a location database.

The first operative mode represented in FIG. 1b, consists in declaring each terminal, separately in relation to the network, situated or not situated behind the same residential gateway, even when these terminals share one and the same public identity. The network then acts as if the declared terminals were not hosted by the same residential gateway.

In this multiline operative mode during the registration phase, each declared terminal announces its network address, IP address+port pair, and its public identity, telephone number. The corresponding association is stored in a database so as to be interrogated by a specific item of equipment, such as an SIP proxy, handling the trunking of the incoming calls to their final destination(s).

Each terminal has a priori a different network address from the others, independently of the fact that it does or does not share its public identity with another terminal.

Within the framework of the aforesaid operative mode, one and the same public identity thus points to several network addresses. With each incoming call to a given public number, on receipt of a call setup message, the SIP proxy forwards this message to each of the SIP destinations through interrogation of the database. In this automatic call distribution system referred to as "forking", the residential gateway merely routes the incoming IP packets, as would a simple IP router.

A second operative mode, represented in FIG. 1c, consists in incorporating into the residential gateway an application package processing allowing the gateway to offer the network a single physical interface by handling the final trunking of the incoming calls to the appropriate SIP destination or destinations, that is to say the terminals.

During the registration phase, the residential gateway sends registration messages for the account of the terminals that it links.

Several modes of implementation are conceivable, depending on whether the terminals send or do not send any registration messages.

Under the first assumption, the residential gateway intercepts the "REGISTER" registration messages sent by the SIP terminals and modifies them so as to appear as the single SIP destination for the whole set of numbers attached to the terminals that it connects. Furthermore, the residential gateway stores in an internal database the correspondence between the public identity allocated to the terminal and the associated network address.

Under the second assumption, the residential gateway determines on the basis of configuration data the associations between network addresses of the terminals and corresponding allocated public identities, then sends one or more "REGISTER" registration messages on the basis of these associations, here again passing itself off as the single SIP destination to be contacted. On receipt by its internal SIP processing logic of an "INVITE" call setup message, the residential gateway determines the public identity targeted by the call, by inspecting the header of the SIP message "To", then interrogates its internal database, so as to retrieve the SIP terminal or terminals concerned so as to forward the "INVITE" call setup message to them.

The first and second operative modes of the prior art exhibit the drawbacks hereinafter.

The solution according to the first operative mode according to the "forking" technique requires the storage at each instant by the network of the linkup topology information for all the residential gateways. In addition to the aforesaid storage, this operative mode leads to the generation of more signaling than is necessary. Specifically, the operations of registering/de-registering the terminals lead systematically to exchanges of registration messages. Moreover, during an incoming call, a call setup request must be sent to each of the terminals. The network must then take on board the cancellation of the transactions with no response by the targeted terminal.

The solution according to the second operative mode, palliative processing incorporated into the gateway, exhibits the drawback of adding non-trivial application procedures to the residential gateway, as well as an internal mini-database. This solution therefore appears to be prejudicial to the performance of the residential gateway.

The subject of the present invention is to remedy the drawbacks of the aforesaid prior art solutions.

SUMMARY OF THE INVENTION

A subject of the present invention is the implementation of a method and of a residential gateway that may suit all the linkup configurations and terminals behind a residential gateway, in particular, a public identity per terminal, a public identity shared by several terminals, several public identities attached to the same terminal.

Another subject of the present invention is furthermore the implementation of a method and of a residential gateway not requiring any incorporation of application into the residential gateway, the latter not having to be aware of the correspondence between the terminals that it links up and their associated public identities, so as to reduce to a situation comparable to the mode of network handling via "forking".

Another subject of the present invention is also the implementation of a method and of a residential gateway in which the management of the terminal association or terminal address and public identity is also no longer performed by the network, which, in particular, does not have to be aware of the number of terminals associated with a public identity and of their respective network address (addresses), the network having to be aware only of the correspondence between the public identity or identities and the network address of the residential gateway, so as to reduce to a situation comparable with the operative mode with SIP application package processing incorporated into the gateway. This exhibits the advantage of not complicating the processing of the incoming calls destined for a number corresponding to several terminals situated behind one and the same residential gateway.

Specifically, in such linkup configurations, a single call setup request is sent to the gateway, rather than one per terminal corresponding to the requested number.

In particular, a subject of the present invention is the implementation of a residential gateway operating mechanism making it possible to process complex linkup configurations, in particular suited to the linking up of terminals sharing one and the same call number, a residential gateway in accordance with the subject of the invention being dubbed "multi-line" when, linking up several terminals, one and the same public identity is associated with them, a telephone number corresponding to a particular case of public identity.

Another subject of the present invention is, finally, the implementation of a method and of a residential gateway operating with a call control signaling protocol based on an IP technology, in particular, the SIP protocol defined by RFC 3261, the H.323 protocol or ultimately any other call control protocol of the same type.

Another subject of the present invention is also the implementation of a method and of a residential gateway that may be implemented not only for SIP terminals, but also for any termination point of SIP type internal to the residential gateway, in fact representing an interface to a non-IP terminal, the processings necessary for such a transition being performed by the corresponding VEG module internal to the residential gateway.

The method for linking to an IP network, by way of a residential gateway, a plurality of IP communication entities to which are allocated respective public identities and which are able to implement a call control protocol, said IP communication entities, internal or external to the gateway, being connected to the latter, which is the subject of the invention, is noteworthy in that it comprises a prior step of registering the respective public identities of said IP communication entities, each entity public identity being associated during registration with a network address of the gateway, in such a way that a message according to the call control protocol and addressed to said public identity is transmitted to the gateway.

In the event of reception by the gateway of a message according to the call control protocol, a step of transferring said message from the gateway to all the connected entities, and after receipt of the message by a connected entity, a step of filtering of the message by said entity, in the course of which the entity determines whether the message is addressed to the public identity allocated to it.

The method which is the subject of the invention is furthermore noteworthy in that, in the case of a message according to the SIP protocol, the step of filtering the message is carried out on the basis of the content of one at least of the fields of the group comprising the field identifying the recipient of the message and the field defining the unit handling the processing of the message.

The residential gateway for linking to an IP network a plurality of IP communication entities that are able to implement a call control protocol, this residential gateway connected to the IP network having available an IP network address, which is the subject of the invention, is noteworthy in that it comprises at least one module for transferring to all the IP communication entities connected to it messages according to the call control protocol, that are received by said gateway and addressed to a public identity associated with one at least of the IP communication entities connected to the gateway.

The IP communication entity to which a public identity, which is the subject of the invention, is allocated, is noteworthy in that it includes at least one message filtering module designed to determine whether a message received is addressed to the public identity allocated thereto.

The IP communication entity, is furthermore noteworthy in that it is able to be integrated into a residential gateway and that it comprises means for communicating with a non-IP external communication terminal.

The IP communication entity, which is the subject of the invention is finally noteworthy in that the message filtering module is designed, on receipt of a message, to analyze at least one of the fields of the group comprising a field identifying the recipient of the message and a field defining the entity handling the processing of the message, said fields being contained in the message received.

The method, the residential gateway and the communication entity IP, which are the subjects of the present invention, find application to the management of the linking up of IP terminals and non-IP terminals having a public identity and triggering a call control protocol, such as domestic terminals or of a mono or multimedia local network for analog telephones, visiophones, PC personal computers, digital televisions or others that can have one and the same public identity.

BRIEF DESCRIPTION OF THE DRAWINGS

They will be better understood on reading the description and observing the drawings hereinafter in which, in addition to FIGS. 1a with 1c relating to the prior art.

DESCRIPTION OF PREFERRED EMBODIMENTS

The method for linking to an IP network IP communication entities that are able to implement a call control protocol, by way of a local gateway, which is the subject of the invention, will now be described in a detailed manner. The IP communication entities are internal or external to the local gateway. In the particular, nonlimiting, example of the description, the call control protocol is the SIP protocol and the local gateway is a residential gateway, situated in a user's residence.

In the particular example described for the implementation of the method which is the subject of the invention, we consider:

the residential gateway, denoted $P_z$, z denoting the IP address of the residential gateway, two IP communication entities consisting of IP terminals, external to the gateway $P_z$ and connected to the latter, and denoted $E_{x,pu}$ where x denotes the IP address of the IP entity considered and pu the public identity associated with the IP entity considered, an IP communication entity consisting of a VEG (for VoIP Embedded Gateway) module, internal to the gateway $P_z$ and connected to the latter, and denoted $E_{y,pu}$ where y denotes the IP address of the entity considered and pu the public identity associated with the IP entity considered.

Of course, the invention can be applied to any other system of this type comprising at least one residential gateway and a plurality of IP communication entities, internal or external to the gateway and connected to the latter.

Figure 1A:
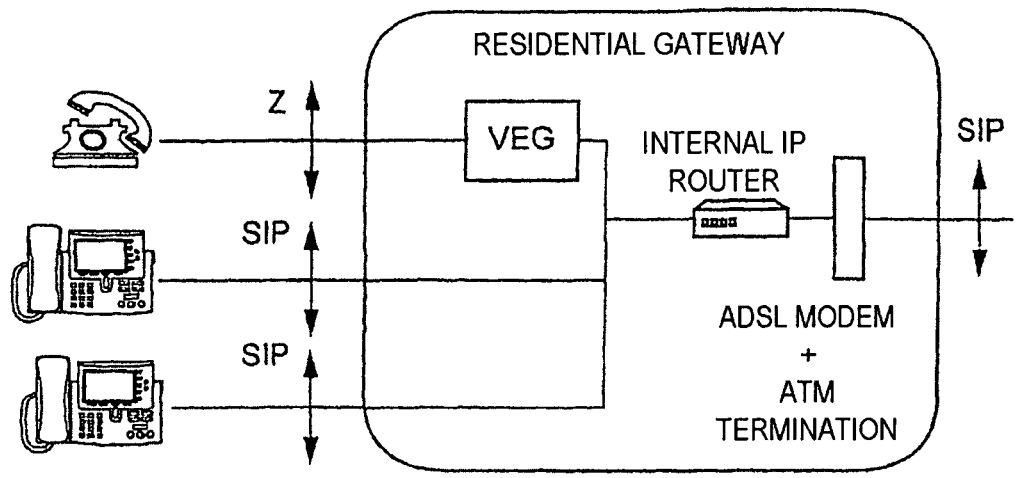
Figure 1B:
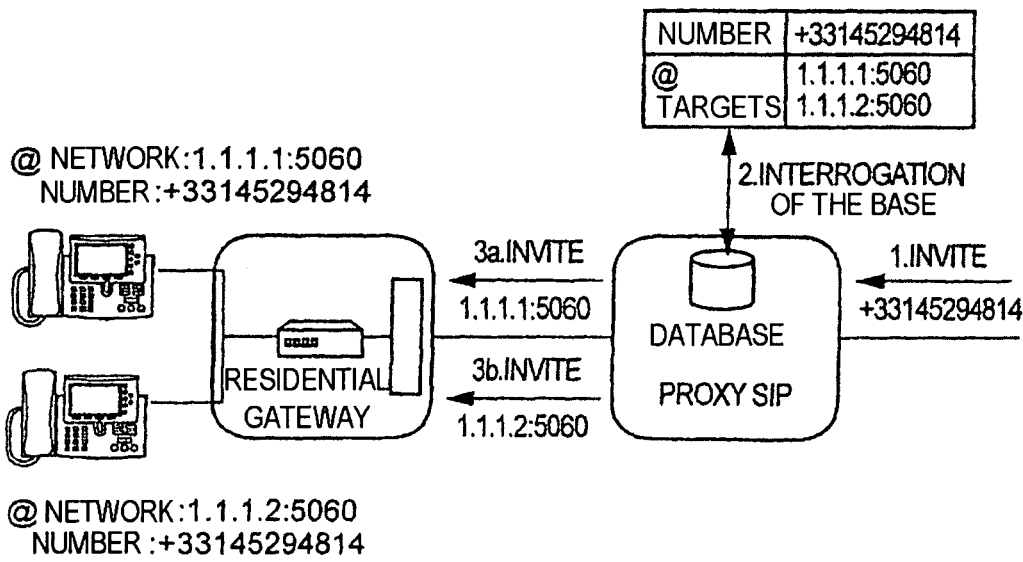
Figure 1C:
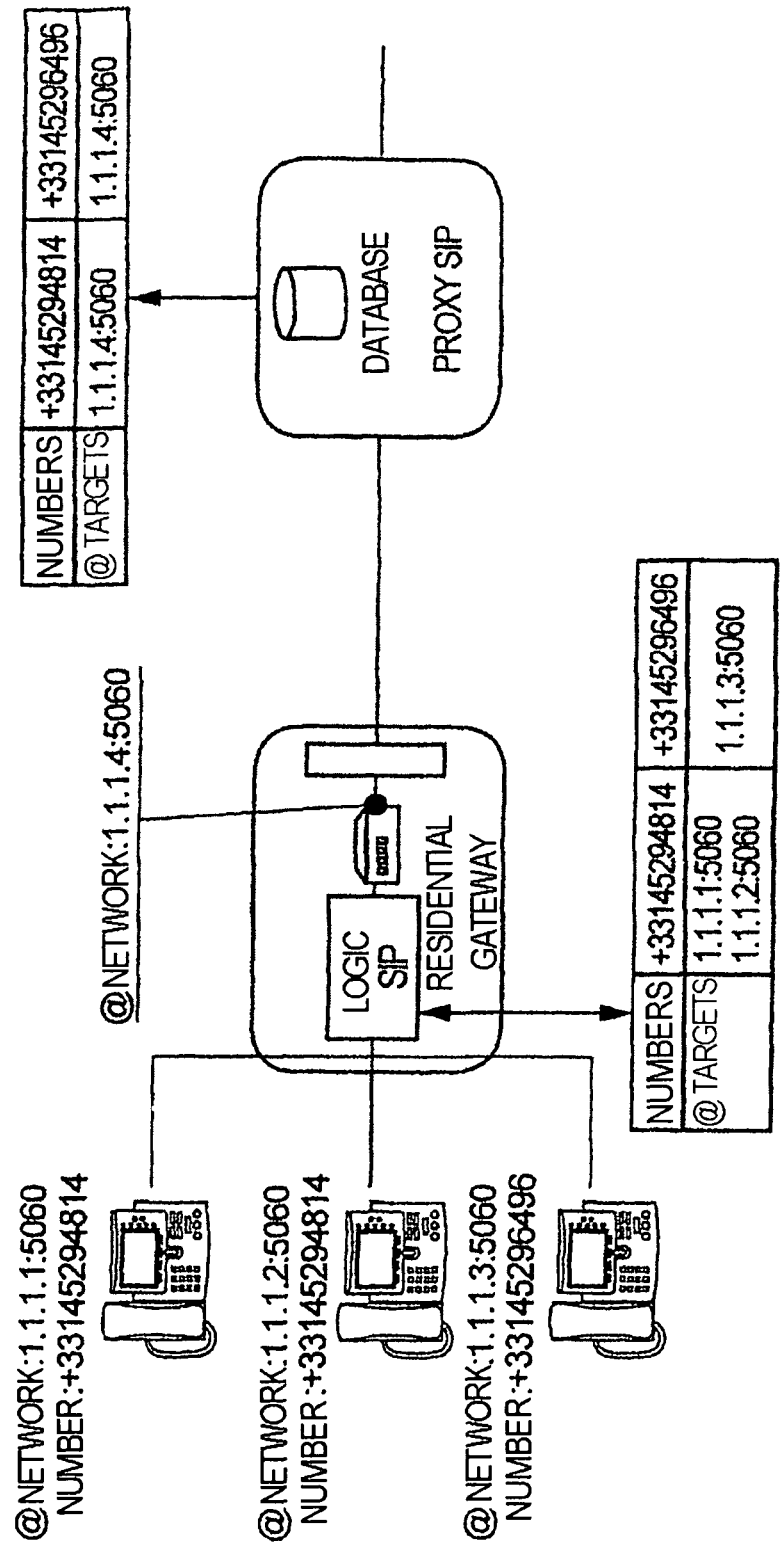
Figure 2A:
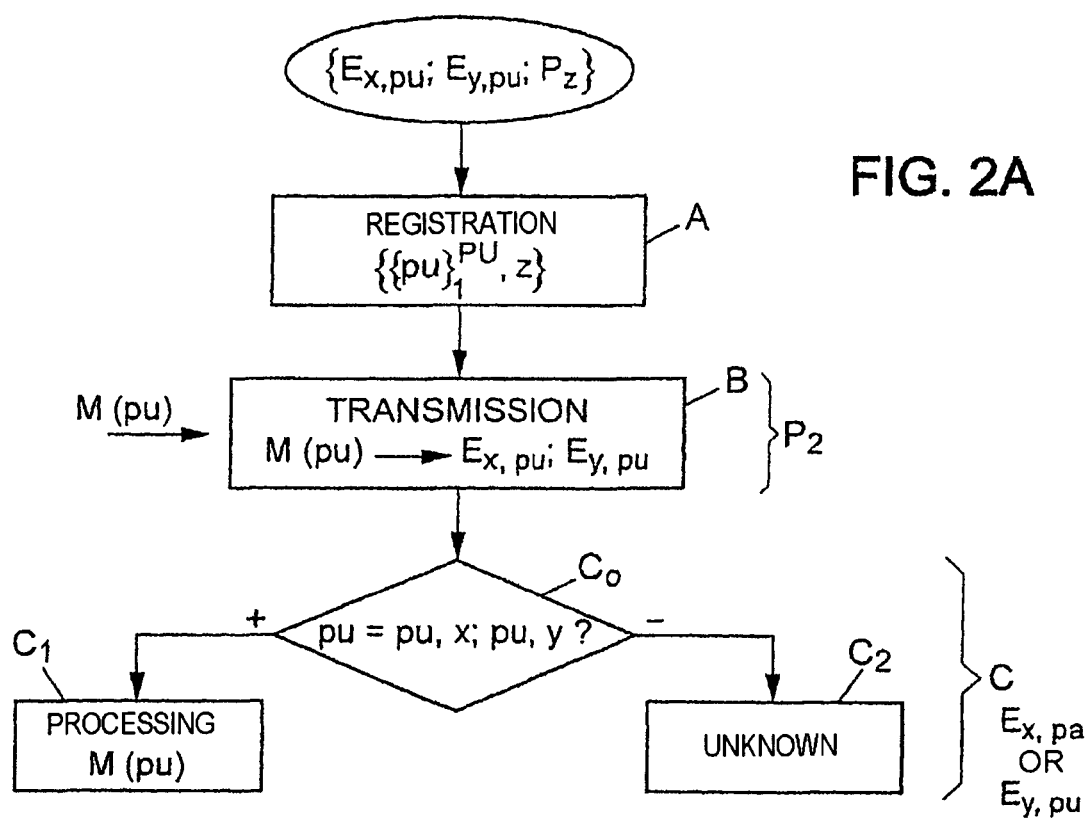
FIG. 2a represents, by way of illustration, a flowchart of the essential steps for implementing the method which is the subject of the present invention.

As will be observed in FIG. 2a, the linkup method which is the subject of the invention consists, in a step A, in registering the public identity of each connected communication entity, this public identity being associated with the network address z of the gateway $P_z$ during registration.

In FIG. 2a, this operation is denoted:

registration $\{\{pu\}_t^{PU}, z\}$

The aforesaid registration is performed in such a way that any message according to the call control protocol designated hereinafter, message denoted M(pu), be it a call setup request or any other message transmitted according to the call control protocol, to this public identity pu is addressed to the residential gateway $P_z$.

Step A, following the reception of this message M(pu) by the residential gateway, is followed by a step B of transferring the message M(pu) to all the IP communication entities, internal $E_{x,pu}$ or external $E_{y,pu}$ to the gateway $P_z$ and connected to the latter, from the residential gateway $P_z$.

In step B of FIG. 2a, the transfer operation is denoted:

Transfer M(pu)→$E_{x,pu}$; $E_{y,pu}$.

The aforesaid transfer operation B allows each of the IP communication entities internal $EP_{x,pu}$ or external $EP_{y,pu}$ to the gateway $P_z$ to thereafter filter the message M(pu), so as to determine whether or not this message is addressed to a public identity allocated to it.

In a general way, it is considered that the linkup process, in accordance with the linkup method which is the subject of the invention, consists at least of steps A, B, described with FIG. 2a.

However, this linkup process for executing the linkup method which is the subject of the invention is then followed at the level of each IP communication entity $E_{x,pu}$, $E_{y,pu}$ by a filtering process in step C represented in the aforesaid FIG. 2a.

As will be observed in FIG. 2a, for a message M(pu) each internal or external IP communication entity can undertake, in a step $C_0$, a verification by comparing the public identity called in the message M(pu) with its own public identity allocated to it.

This step is represented in step $C_0$ of FIG. 2a by the test relation:

pu=pu,x; pu,y ?

Through the aforesaid test, it is understood that each internal or external IP communication entity that is a recipient of the message M(pu) undertakes an identification in the aforesaid step $C_0$.

On a negative response to the test of the aforesaid step $C_0$, the internal or external IP communication entity considered in step $C_2$ ignores the message.

Conversely on a positive response to the test of step $C_0$, that is to say in the event of identity between the public identity called in the message received and the public identity allocated to the internal or external IP communication entity considered, step $C_0$ is followed by a step $C_1$ of processing the aforesaid message M(pu). In a specific manner, it is indicated that the process for filtering the messages received, these messages having been transmitted according to the SIP protocol, consists in determining, for each message received by an IP communication entity, whether the message is addressed to the public identity allocated to this IP communication entity either on the basis of the field identifying the recipient of the message, that is to say the field denoted by field "To" according to the SIP protocol, or on the basis of the field defining the unit handling the processing of the message, that is to say on the basis of the field denoted "REQUEST URI" according to the SIP protocol.

When the internal or external IP communication entity $E_{x,pu}$ $E_{y,pu}$ is recognized to be a recipient for example of a request, the latter performs the processing associated with the reception of the aforesaid request, this processing being able to consist for example in the fact of ringing on receipt of a call setup request, the ring occurring either at the level of the IP communication entity, or conversely at the level of the non-IP terminal when the latter is linked to an internal IP communication entity associated with it.

Otherwise, as is represented in FIG. 2a, the call setup request M(pu) is then ignored.

More specifically, the transfer step B of FIG. 2a, is executed by transferring the message M(pu) over the IP network to each of the external IP communication entities connected on the basis of the residential gateway $P_z$.

Conversely, in the case where the gateway comprises and integrates internal IP communication entities to which non-IP terminals are linked, the residential gateway $P_z$ forwards the aforesaid messages M(pu) to each of the corresponding internal modules VEG, as if it were in fact an IP terminal. The IP communication entity invoked then processes the message M(pu) in the same way as would an IP terminal.

Figure 2B:
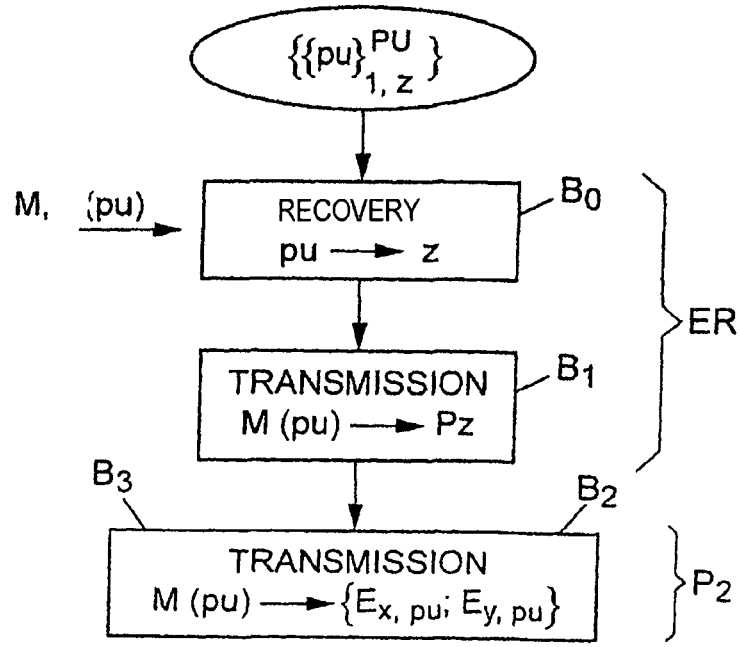
FIG. 2b represents by way of illustration a flowchart according to a nonlimiting preferential mode for implementing the step of transferring the residential gateway to all the IP communication entities on the basis of the residential gateway.

A more detailed description of the transmission operation B of FIG. 2a will be now given in conjunction with FIG. 2b, this transmission operation being performed at the level of the residential gateway $P_z$.

In a general manner, it is indicated, by way of nonlimiting example, that the registration operation A can be performed by the network, this operation being described subsequently in the description.

Under these conditions, the registration proper of the whole set of public identities denoted $\{\{Pu\}_t^{PU}, z\}$ associated with the network address z of the residential gateway $P_z$ is available at the level of the aforesaid performed registration.

More specifically, during the transmission of a call setup request M(pu), this request is transmitted by way of an item of network equipment ER formed by an SIP proxy when the SIP protocol is implemented, this item of network equipment ER being associated, inter alia with the gateway $P_z$ and making it possible to manage this gateway $P_z$.

With reference to FIG. 2b, the item of network equipment ER proceeds on receipt of the message M(pu) to the recovery of the network address z of the residential gateway $P_z$ by identifying the public identity called pu, on the basis of the registration previously mentioned, in sub-step $B_0$ of FIG. 2b.

The item of network equipment ER then proceeds in sub-step $B_1$ to the transmission to the residential gateway $P_z$ of the message M(pu) at the address z which was recovered in the previous step $B_0$.

On receipt of the message M(pu) by the residential gateway $P_z$, the latter, in sub-step $B_2$, undertakes the transfer of the message M(pu) to the whole set of IP communication entities internal or external to the platform $P_z$ and connected to the latter.

Figure 2C:
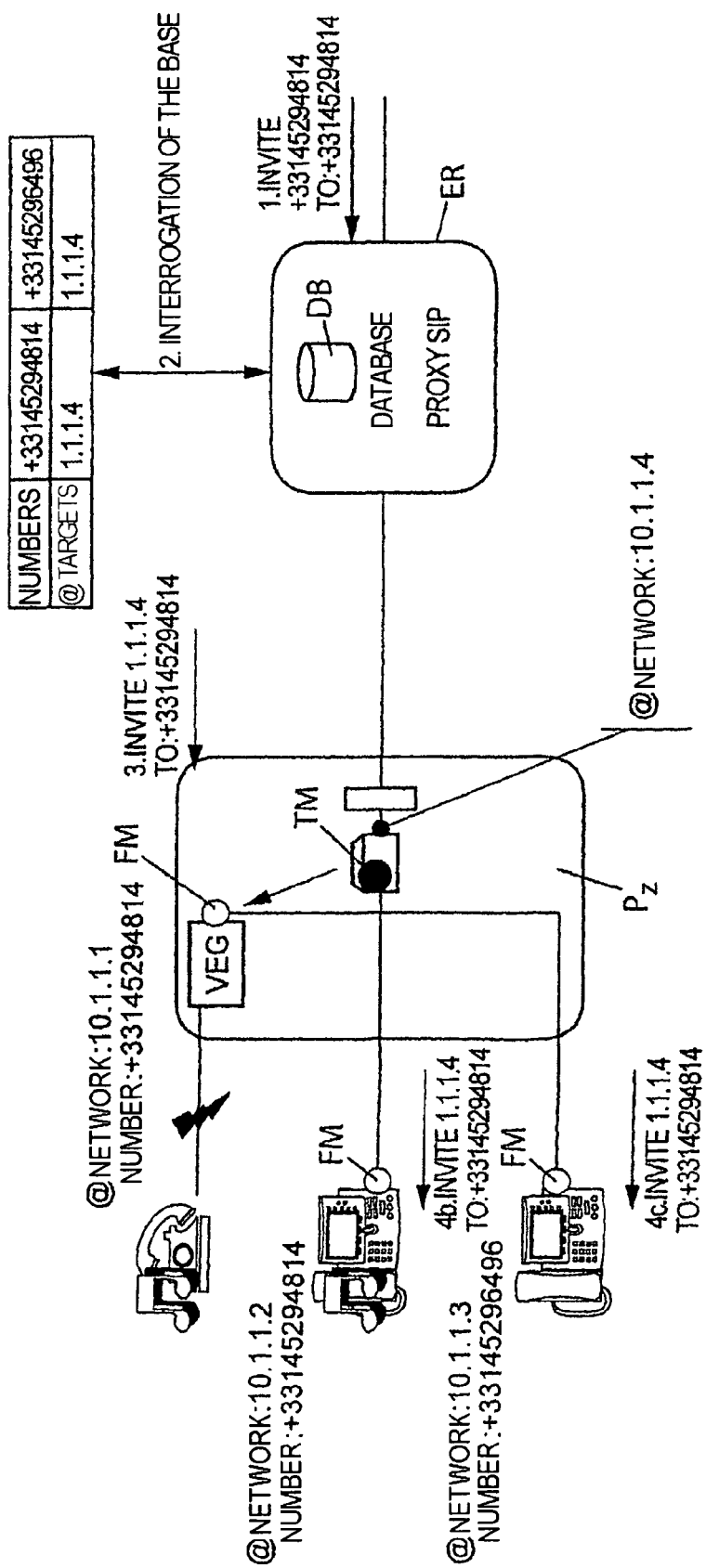
FIG. 2c represents, by way of illustration, an exemplary implementation of the method for linking IP communication entities to an IP network for an installation comprising a residential gateway connected to an SIP proxy and to two IP communication entities as well as to a non-IP terminal, such as a fixed telephone handset connected to an internal IP communication entity integrated into the residential gateway, in accordance with the subject of the present invention.

A more detailed description of the operative mode of the linkup method, which is the subject of the invention, will be now given in conjunction with FIG. 2c in a nonlimiting specific domestic configuration given solely by way of example.

The initial domestic configuration represented in FIG. 2c is considered in particular, in which the gateway $P_z$ whose IP network address is z="1.1.1.4" links two terminals associated with one and the same public identity consisting of a telephone number+33 14 52 94 814.

The first terminal, terminal of non-IP type, is represented by an internal VEG module, constituting an internal IP communication entity having an IP address y="10.1.1.1".

The second terminal of IP communication entity type external to the gateway $P_z$ and linked to the latter has a network address x="10.1.1.2".

As furthermore represented in FIG. 2c, the gateway $P_z$ also links a third terminal, of external IP communication entity type, whose public identity is different+33 14 52 96 496 and having a network address x="10.1.1.3".

In accordance with a noteworthy aspect of the method which is the subject of the invention, step A consisting in performing the registration can advantageously include the creation of a location database DB of the association between the set of first and second aforesaid public identities and of the IP address of the residential gateway $P_z$.

In FIG. 2c it is understood that the aforesaid registration comprises the public identities+33 14 52 94 814 and+33 14 52 96 496 referred to as numbers associated with the target, that is to say with the IP address of the residential gateway z="1.1.1.4".

For the implementation of the aforesaid registration several operative modes can be performed. The aforesaid registration can, for example, be configured by default in the location database DB upon the user's subscription to the telephone service.

This registration can also be dynamic according to the mechanism defined by the standard RFC3261 of the SIP protocol (for Session Initiation Protocol). Under this assumption each terminal transmits a "REGISTER" request to the network, the contact address contained in these request messages corresponding to the contact address of the residential gateway.

In the example given in conjunction with FIG. 2c, during a call phase for example, the item of network equipment ER responsible for the residential gateway $P_z$ receives a message constituting a request to set up a call M(pu) destined for a public identity, the number+33 14 52 94 814 previously described. The item of network equipment ER formed by the SIP proxy recovers from the location database DB the network address z associated with this public identity and retransmits the call setup message to this address z. The residential gateway $P_z$ receiving this message forwards it immediately to the internal or external IP communication SIP entities that it links.

The IP terminals and the IP termination then examine the SIP field "To" of this request, that is to say the field containing the public identity of the requested terminal, so as to determine whether this request is or is not intended for them.

The two SIP external or internal IP communication entities responding to the number+33 14 52 94 814 then deduce from this analysis that the request is intended for them and ring, while the IP communication entity associated with the number+33 14 52 96 496 ignores the aforesaid request message.

The rest of the call setup is performed as defined in the standard RFC3261.

The chronology of the messages transmitted between the network entity ER formed by the SIP proxy, the residential gateway $P_z$ and each of the IP communication entities represented in FIG. 2c is as follows:

1: INVITE; To+33 14 52 94 814
2: DB Interrogation
3: INVITE; 1.1.1.4; To+33 14 52 94 814
4a: Redirection; 1.1.1.4;+33 14 52 94 814 to VEG
4b: INVITE; 1.1.1.4; To+33 14 52 94 814 to 10.1.1.2
4c: INVITE; 1.1.1.4; To+33 14 52 96 496 to 10.1.1.3

A more detailed description of a residential gateway for linking to the IP network a plurality of internal or external IP communication entities that are able to implement a call control protocol, this residential gateway connected to the IP network having an IP address, in accordance with the subject of the present invention, will be now given in conjunction with FIG. 2c.

As represented in FIG. 2c, the residential gateway $P_z$ includes at least one transfer module denoted TM with the function of forwarding to all the IP communication entities, internal or external to the gateway $P_z$ and connected to the latter, the messages received by the gateway $P_z$, and addressed to at least one among the plurality of public identities respectively associated with these connected IP communication entities.

It is indicated that the aforesaid transfer module TM can consist of a software module making it possible to simply ensure the redirection of the message M(pu) to any internal IP communication entity, such as a VEG module associated with a non-IP terminal, as previously described in conjunction with FIG. 2c, or, conversely, the transmission by network, that is to say by transmission of an "INVITE" message within the framework of the SIP protocol to any external IP communication entity connected to the aforesaid residential gateway $P_z$. These "INVITE" messages are messages 4b and 4c of the figure previously mentioned in the description.

The external respectively internal IP communication entity having a public identity and an IP address, in accordance with the subject of the present invention, is noteworthy in that each of these latter includes a module FM for filtering the messages M(pu) received, whose function is to determine, for each message received, whether this message is addressed to the public identity allocated to the IP communication entity considered.

This filtering module can consist of a software module installed directly in the IP communication entity considered and in particular in the VEG module integrated into the residential gateway $P_z$.

When the filtering module FM is integrated into the VEG module, that is to say into the IP communication entity internal to the gateway $P_z$, this IP communication entity advantageously comprises a module for communicating with a non-IP terminal external to the gateway $P_z$. The role of this communication module is to ensure connection of the VEG module, internal to the gateway $P_z$, to the non-IP terminal, external to the gateway $P_z$, as well as communication between the VEG module and the non-IP terminal.

As previously mentioned within the framework of the description of the method which is the subject of the invention, it is indicated that the filtering module FM executes an evaluation either of the field identifying the recipient of the message, or of the field defining the unit handling the processing of this message.

As mentioned previously in the description, it is either the field "To" of the SIP messages or conversely the field defining the unit handling the processing for example the field comprising the network address "10.1.1.1" of the internal IP communication entity consisting of the VEG module integrated into the gateway $P_z$ represented in FIG. 2c, for the non-IP terminal associated with it.

The invention also covers a computer program for a residential gateway comprising instructions able to control the transferring, by the gateway, of a message according to a call control protocol received by the gateway, to all the IP communication entities connected to it, when the program is executed by the gateway. This program can be stored in or transmitted by a data medium. The latter can be a hardware storage medium, for example a CD-ROM, a magnetic diskette or a hard disk, or else a transmissible medium such as an electrical, optical or radio signal.

It is of course understood that the corresponding program product is then stored either by downloading or in any other way at the residential gateway $P_z$ level and in particular in the transfer module TM represented in FIG. 2c.

The invention also covers a computer program for an IP communication entity, such as previously described, to which a public identity is allocated, comprising instructions for executing a filtering of the messages according to a call control protocol received by said entity so as to determine whether these messages are addressed to the public identity of said entity, when the program is executed by the IP communication entity. This program can be stored in or transmitted by a data medium. The latter can be a hardware storage medium, for example a CD-ROM, a magnetic diskette or a hard disk, or else a transmissible medium such as an electrical, optical or radio signal.

In the preceding description, the messages are transmitted to the residential gateway according to the SIP protocol. The invention also applies to the transmission of messages according to the H323 protocol or according to any other call control protocol designed to be implemented by IP communication entities, connected to the IP network but each comprising a public identity which is allocated to them, and distinguishing between the concept of public identity and that of network address. To go back to the particular example of the H323 protocol, this protocol also envisages a registration phase making it possible to register in the network the correspondence between a user's public identity and the network address of his location point in the network. It therefore suffices to register, during this registration phase and via messages defined by the H323 protocol, the correspondence between the network address, in this instance the IP address, of the residential gateway and the respective public identities associated with the IP communication entities that it links. The role of the residential gateway is then to forward all the messages, in particular the SETUP call setup requests as defined by the H323 protocol, that it receives to all the H323 entities that it links. In the same way as in the case of the SIP protocol, each entity H323 is left to handle the operation of filtering the messages received so as to determine, for each message received, whether or not it is intended for the entity considered.

The invention claimed is:

1. A method for linking to an IP network, by way of a residential gateway, a plurality of IP communication entities to which are allocated respective public identities and which are able to implement a call control protocol, said IP communication entities, internal or external to the gateway, being connected to the latter, said method comprising:

a prior step of registering the respective public identities of said IP communication entities, each entity's public identity being associated during registration with a network address of the gateway, in such a way that a message according to the call control protocol and addressed to said public identity is transmitted to the gateway;

in the event of the receipt by the gateway of a message according to the call control protocol, a step of transferring said message from the gateway to all connected IP communication entities; and after receipt of the message by a connected IP communication entity, a step of filtering of the message by said connected IP communication entity, in the course of which the connected IP communication entity determines whether the message is addressed to the public identity allocated to it.

2. The method as claimed in claim 1, in which the call control protocol is one of the protocols of the group comprising the SIP protocol and the H323 protocol.

3. The method as claimed in claim 2, in which, in the case of a message according to the SIP protocol, the step of filtering the message is carried out on the basis of the content of one at least of the fields of the group comprising the field identifying the recipient of the message and the field defining the unit handling the processing of the message.

4. The method as claimed in claim 1, in which, in the case where during the filtering step, the IP communication entity determines that the message received is addressed to the public identity allocated to it, said entity executes a processing associated with the message.

5. The method as claimed in claim 1, in which, in the course of the prior registration step, the respective public identities of the connected entities and the network address of the associated gateway are registered in a location database, accessible to an item of routing network equipment associated with the gateway.

6. The method as claimed in claim 5, in which, in the event of reception by the item of routing network equipment of a message to set up a call according to the call control protocol, addressed to one of the entities registered in association with the network address of the gateway, the item of routing network equipment recovers from said database the network address of the gateway, on the basis of the public identity to which the message is addressed, then transmits the message to the gateway at said recovered network address.

7. A residential gateway for linking to an IP network a plurality of IP communication entities that are able to implement a call control protocol, the gateway connected to the IP network having available a network address, said residential gateway comprising:
   an interface adapted to be connected to the IP network; and
   a module for transferring to all the IP communication entities connected to the residential gateway messages according to the call control protocol, that are received by said interface and addressed to a public identity associated with one at least of the IP communication entities connected to the residential gateway.

8. A non-transitory computer readable storage medium, having stored thereon a computer program comprising program instructions, the computer program being loadable into a data-processing unit of a residential gateway and adapted to control the transferring by the residential gateway of a message according to a call control protocol, received by said residential gateway and addressed to a public identity associated with at least one of IP communication entities connected to the residential gateway, to all the IP communication entities connected to the residential gateway, when it is executed by the data-processing unit.

* * * * *